United States Patent
Supplee et al.

(10) Patent No.: US 7,031,284 B2
(45) Date of Patent: Apr. 18, 2006

(54) WIRELESS COMMUNICATION METHOD AND APPARATUS FOR OPTIMIZING MULTI-USER DETECTION

(75) Inventors: Stephan Shane Supplee, Coatesville, PA (US); Chayil S. Timmerman, Harleysville, PA (US); Ryan Samuel Buchert, Phoenixville, PA (US); Peter Edward Becker, Coatesville, PA (US); Tonino Nasuti, Norristown, PA (US); Robert A. DiFazio, Greenlawn, NY (US); John W. Haim, Baldwin, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 3 days.

(21) Appl. No.: 10/725,808

(22) Filed: Dec. 2, 2003

(65) Prior Publication Data

US 2004/0174854 A1 Sep. 9, 2004

Related U.S. Application Data

(60) Provisional application No. 60/452,162, filed on Mar. 3, 2003.

(51) Int. Cl.
*H04B 7/216* (2006.01)

(52) U.S. Cl. .................... 370/335; 370/342; 375/152
(58) Field of Classification Search ............... 370/335, 370/342; 375/152, 148
See application file for complete search history.

(56) References Cited

U.S. PATENT DOCUMENTS

| | | | | |
|---|---|---|---|---|
| 5,809,043 A | * | 9/1998 | Hassan et al. | 714/780 |
| 6,233,373 B1 | * | 5/2001 | Askins et al. | 385/12 |
| 6,470,047 B1 | * | 10/2002 | Kleinerman et al. | 375/232 |
| 6,704,376 B1 | * | 3/2004 | Mills et al. | 375/341 |
| 2004/0008662 A1 | * | 1/2004 | Yousef et al. | 370/350 |

* cited by examiner

*Primary Examiner*—Ricky Q. Ngo
*Assistant Examiner*—Richard Chang
(74) *Attorney, Agent, or Firm*—Volpe and Koenig, P.C.

(57) ABSTRACT

Multi-user detection (MUD) performance is optimized to eliminate redundant use of power during processing. An overbuilt A-matrix, i.e., a system response matrix, is provided. The overbuilt A-matrix uses all possible codes, e.g., all codes identified in a candidate code list (CCL) provided by blind code detection (BCD). The overbuilt A-matrix is passed to the MUD which extracts only those rows or columns required for codes that have actually been received, thus eliminating the need to recompute whitening matched filter (WMF) outputs that do not correspond to the actually received code.

28 Claims, 4 Drawing Sheets

WIRELESS COMMUNICATION METHOD AND APPARATUS FOR OPTIMIZING MULTI-USER DETECTION

CROSS REFERENCE TO RELATED APPLICATION(S)

This application claims priority from U.S. Patent Application No. 60/452,162, filed Mar. 3, 2003, which is incorporated by reference as if fully set forth.

FIELD OF INVENTION

This invention generally relates to wireless communications, and more particularly, to joint detection in such systems.

BACKGROUND

Joint detectors, such as multi-user detectors (MUD), reduce the effect of multiple access interference, and hence increase the system capacity. A MUD cancels intra-cell interference and the system capacity is determined by the efficiency of the MUD algorithm and the intercell interference. In addition to capacity improvement, MUD alleviates the near/far problem typical to direct sequence-code division multiple access (DS-CDMA) systems.

Conventional MUD algorithms extract all codes from a system response matrix (i.e., the A-matrix), rather than those codes that have actually been received. This is a substantial waste of computation power and it increases the system delay. To illustrate, the maximum number of transmitted codes in a time slot in the time division duplex (TDD) mode of Universal Mobile Telecommunications System (UMTS) wideband-code division multiple access (W-CDMA) is 16 codes. Therefore, the A-matrix may be constructed using 16 codes. However, suppose only 8 codes were transmitted. Since the MUD algorithm computational complexity is approximately proportional to the square of the number of codes used, the doubling of codes increases the MUD complexity by a factor of 4. Two general MUD implementations use a zero forcing (ZF) block linear equalizer (BLE) and a minimum mean square error (MMSE) solution. ZF BLE is modeled per Equation 1.

$$A^H \bar{r} = (A^H A) \bar{d} \qquad \text{Equation 1}$$

A is the system response matrix. $(\bullet)^H$ is the complex conjugate transpose operation. $\bar{r}$ is the received signal vector for a particular data field. $\bar{d}$ is the soft symbol vector. By using matrix inversion, the soft symbol vector $\bar{d}$ is determined per Equation 2.

$$\bar{d} = (A^H A)^{-1} A^H \bar{r} \qquad \text{Equation 2}$$

$(\bullet)^{-1}$ is matrix inversion.

MMSE is modeled per Equation 3.

$$A^H \bar{r} = (A^H A + \sigma^2 I) \bar{d} \qquad \text{Equation 3}$$

$\sigma^2$ is the noise variance and I is the identity matrix. By using matrix inversion, the soft symbol vector $\bar{d}$ is determined per Equation 4.

$$\bar{d} = (A^H A + \sigma^2 I)^{-1} A^H \bar{r} \qquad \text{Equation 4}$$

The operation $A^H \bar{r}$ is typically called a whitening matched filter (WMF). Notice that it appears within the MUD equations above. A WMF alone is a means of estimating soft-symbols that is typically not as reliable as the MUD output, but has certain use as a lower quality estimate of the soft symbol vector.

MUD performance generally involves performing calculations which consume power that can sometimes be saved, thus providing an economical benefit. More particularly, calculations in support of blind code detection (BCD) and discontinuous transmission (DTX) involve processing that uses power and may require redundant circuitry or software.

Various techniques exist to reduce the complexity of a MUD implementation such as an approximate Cholesky decomposition or fast Fourier transform (FFT) processing. Even so, the MUD represents a large portion of receiver processing and also causes delay in the received signal path. Hence it is desirable to improve receiver/MUD efficiency by reducing the processing requirements and/or delay.

SUMMARY OF THE INVENTION

The invention provides a method and system for determining which codes have been received in a given time slot and eliminating redundant calculations when performing MUD, BCD and/or DTX related processing.

A method is implemented in a code division multiple access (CDMA) system or in a wireless transmit/receive unit (WTRU) that receives a plurality of data signals distinguished by codes. The A-matrix is constructed using a list of possible codes and channel responses associated with their codes, where the list of possible codes consists of either all possible codes based on the system design or a reduced list provided by another receiver algorithm, such as a candidate code list (CCL) provided by BCD. Based on the constructed matrix, soft symbol estimates are computed for the first N symbols of each of the possible codes. Soft symbol estimates may be based on WMF outputs, $A^H \bar{r}$. Based on the N soft symbol estimates, the identities of received codes are determined.

User data is ultimately extracted from the received signal. The extraction of data may be performed using a MUD, which uses the determined identities of the received codes. The N soft symbol estimates may be passed to the MUD, avoiding what would be the recomputation of the same WMF values for the first N symbols associated with the identified received codes.

Codes in the A-matrix identified as received are marked as valid. Codes in the A-matrix identified as not-received are marked as invalid. The invalid codes are not used by the MUD to extract user data.

The identities of the received codes may be determined by code energy measurements derived from the N soft symbol estimates. The code energy measurements and determination of identities of received codes may be performed by receiver processes such as blind code detection (BCD) and/or end-of-DTX detection.

BRIEF DESCRIPTION OF THE DRAWINGS

A more detailed understanding of the invention may be had from the following description of a preferred example, given by way of example and to be understood in conjunction with the accompanying drawing wherein.

DETAILED DESCRIPTION OF THE PREFERRED EMBODIMENT(S)

Although the preferred embodiments are described in conjunction with a preferred TDD/CDMA or time division multiple access (TDMA)/CDMA communication system, some aspects are also applicable to CDMA systems in general. However, the invention in its broad form is envisaged to be applicable to other systems of transmission also, without limitation.

Hereafter, a wireless transmit/receive unit (WTRU) includes but is not limited to a user equipment, mobile station, fixed or mobile subscriber unit, pager, or any other type of device capable of operating in a wireless environment. When referred to hereafter, a base station includes but is not limited to a base station, Node-B, site controller, access point or other interfacing device in a wireless environment.

Although the preferred implementation of the present invention is at a WTRU, it can also be adapted for use at a base station.

Figure 1:
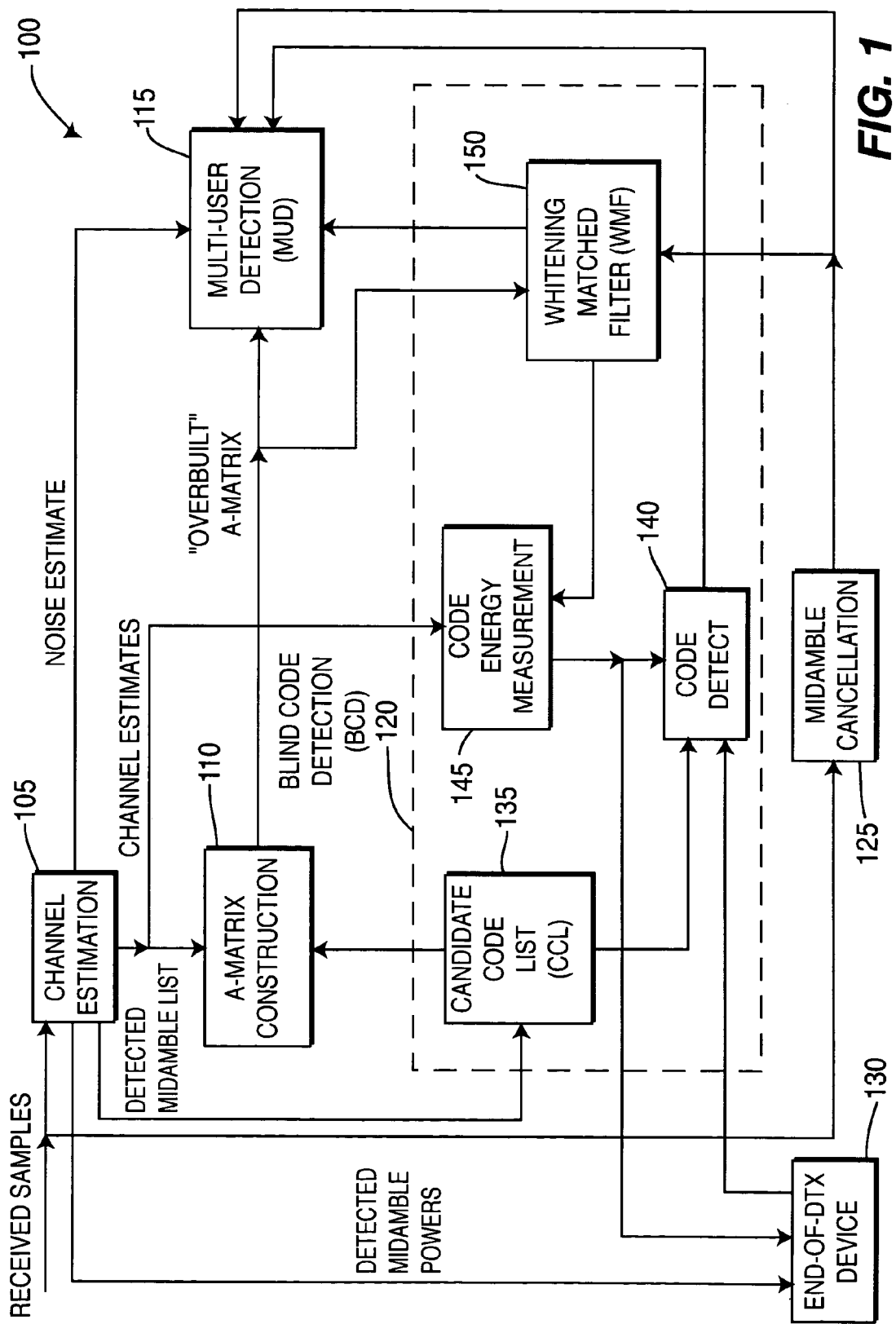
FIG. 1 is a block diagram of a wireless receiver system in which the present invention is implemented.

FIG. 1 shows a preferred embodiment of a wireless receiver system 100. The wireless receiver system 100 includes a channel estimation device 105, an A-matrix construction device 110, a MUD 115, a BCD device 120, a midamble cancellation device 125 and an End-of-DTX device 130. The BCD device 120 includes candidate code list (CCL) device 135, a code detect device 140, a code energy measurement device 145 and a WMF 150. Although the preferred embodiments are described using a MUD 115, BCD device 120 and an End-of-DTX device 130, the invention can be applied to alternate receiver implementations using different receiver algorithms than MUDs, such as a Rake receiver, and with or without a BCD or End-of-DTX device. The wireless receiver system 100 may be incorporated into an integrated circuit (IC) or be configured in a circuit comprising a multitude of interconnecting components.

Figure 2:
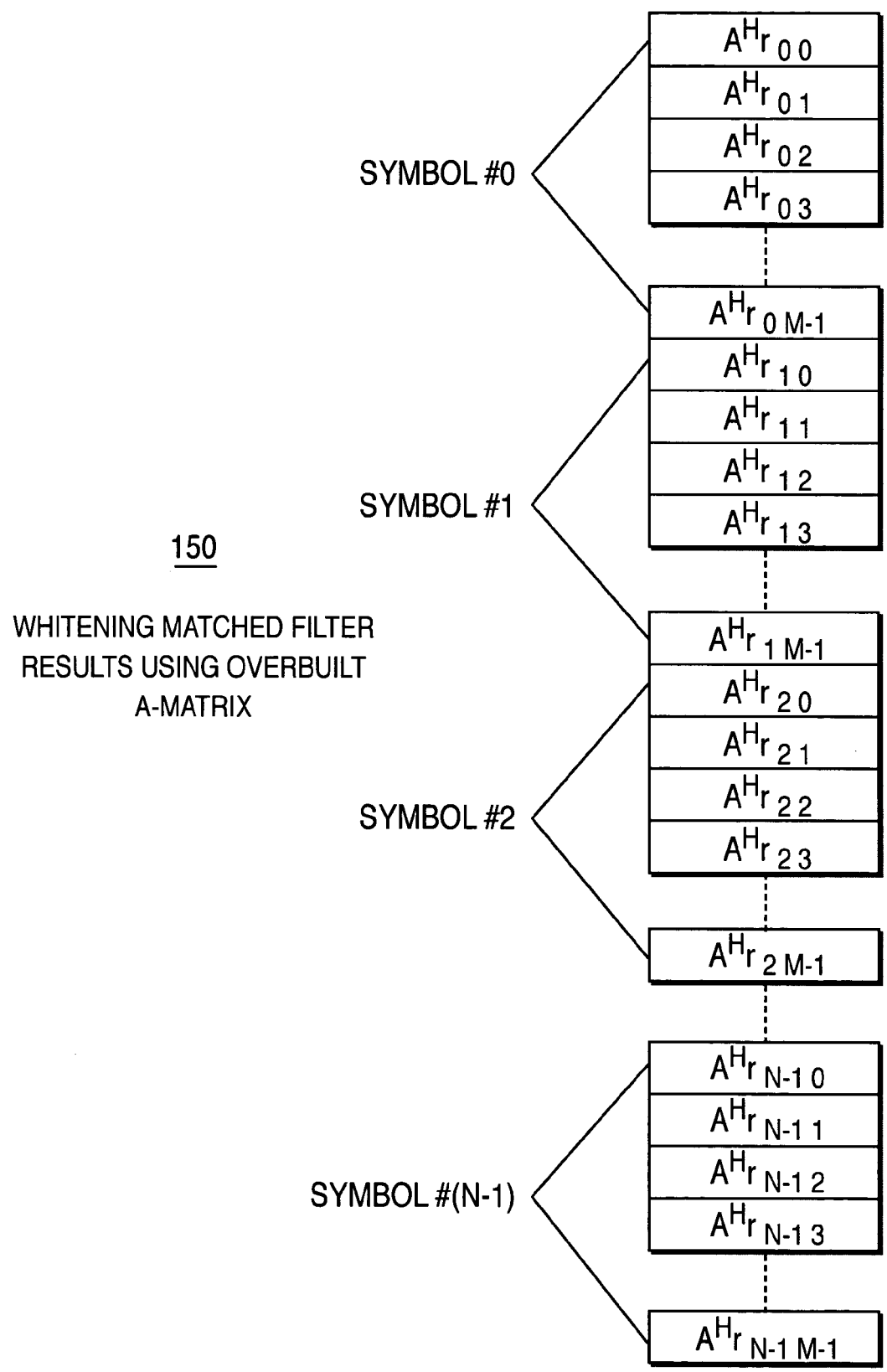
FIG. 2 illustrates WMF results for N symbols using an overbuilt A-matrix.

FIG. 2 shows the WMF results 150 for N symbols based on the "overbuilt" A-matrix 110. The "overbuilt" A-matrix is constructed based on a list of M possible codes in a timeslot. A list of M possible codes, which is a subset of an a priori known list of codes, is provided by the CCL device 135 within the BCD device 120. In an implementation without BCD, the list of M possible codes can be provided by other algorithms or may be a priori known based on the system design. A possible implementation is described in U.S. patent application Ser. No. 10/396,992, filed on Sep. 15, 2003, which is incorporated herein by reference. In order to determine which codes are present, a BCD code energy measurement 145 and an algorithm executed by end-of-DTX device 130 are performed using N symbols of each possible code, where N is less than the total number of symbols per code in the timeslot. The code energy measurement is made using the output of a WMF operation performed with the "overbuilt" A-matrix on the N symbols of the received signal.

In the preferred embodiment for the TDD mode of UMTS W-CDMA, a data burst includes a midamble and two data fields, and channel estimates are calculated on the midamble. The channel estimates are convolved with the spreading code and scrambling code to generate the A-matrix, which is essentially a combined code/channel model that describes the system response. N soft symbol estimates are then generated via a WMF.

FIG. 2 shows a total of M*N soft symbols that are outputted by the WMF 150, where for each of N symbols M soft values correspond to M codes that may or may not have been received. The notation $A^H r_{i,j}$ ($0 \leq i \leq N-1$, $0 \leq j \leq M-1$) is used to indicate the element of the $A^H r$ vector corresponding to soft symbol i computed using code j. For example, $A^H r_{0,2}$ indicates the soft value computed for symbol 0 using code 2.

Figure 3:
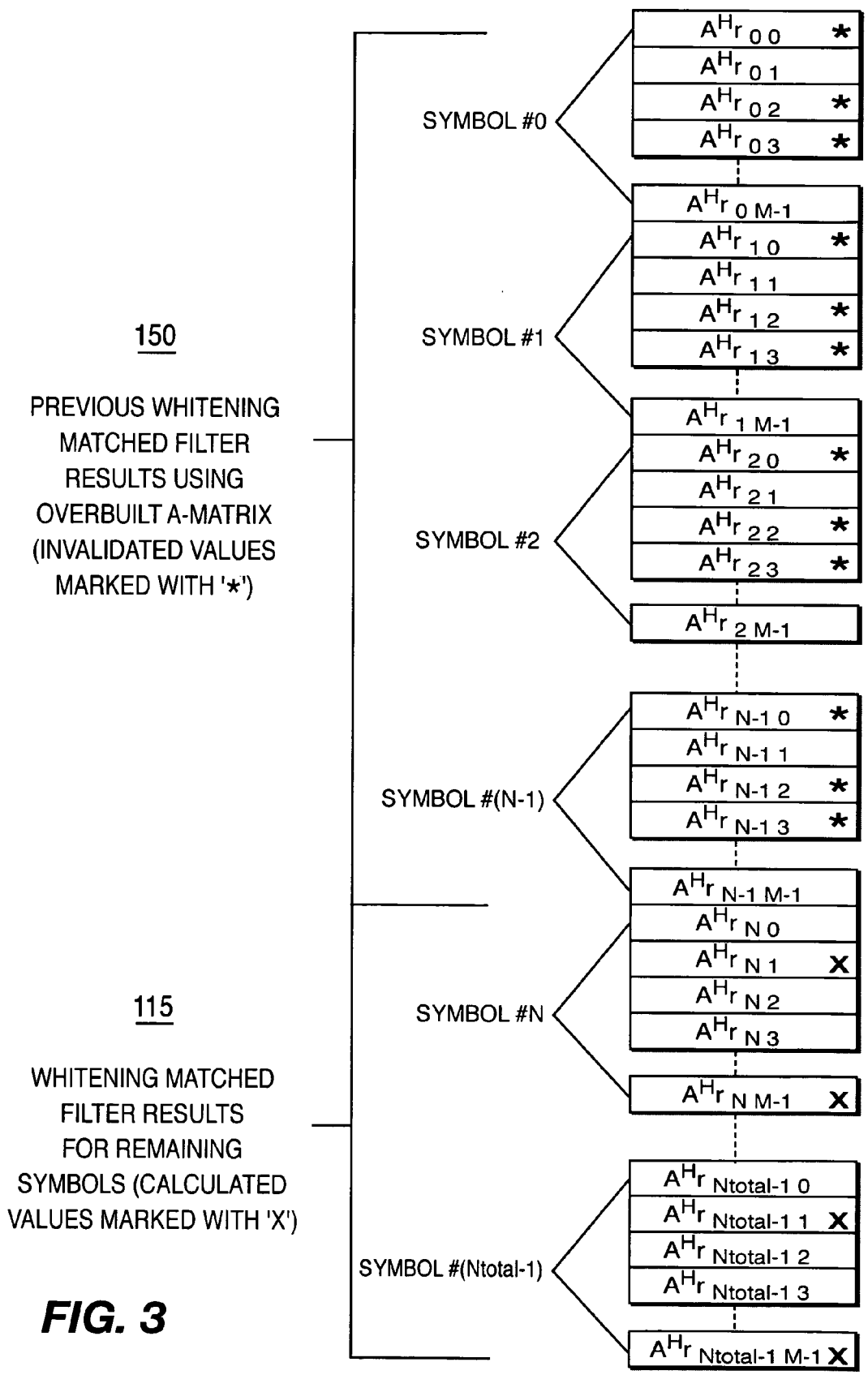
FIG. 3 shows the MUD WMF results.

After the BCD device 120 and the End-of-DTX device 130 are complete, codes that are determined as not-received, i.e., not-present, are invalidated using various addressing techniques, whereby a set of vectors indicate which columns/rows of the A-matrix are valid and which are not. The results of the WMF 150 can then be validated or invalidated based on which code the symbol values are associated with as shown in FIG. 3. For example, if it is determined that code 1 is present, a bit associated with code 1 in the vector set is filled with a "1". This bit indicates that the first column of the A-matrix is valid, and the column is considered during processing. The WMF results 150 that were calculated for code 1 are then considered to be valid and will be used in the MUD calculations 115. Alternatively, if it is determined that code 1 is not present, the bit is filled with a "0" indicating that the particular column should be ignored for the remainder of the process and the WMF results for code 1 will not be used in the MUD calculations. Before executing the MUD algorithm, a list is generated whereby a checkmark, X, 1/0 or other indicator may be used to mark code validity. Vector results indicating the validity of the M codes are sent from the BCD 120 to the MUD 115. The MUD 115 processes symbols in the timeslot for only the codes designated as valid, thus saving calculations, power, and reducing processing time (latency).

Because the WMF 150 was already performed for N symbols, the WMF portion of the MUD algorithm 115 need only perform WMF for the remaining ($N_{total}-N$) symbols, where $N_{total}$ is the total number of symbols in the data burst. The MUD performs these WMF calculations based on the rows or columns of the overbuilt A-matrix that were found to be valid as shown in FIG. 3. This further saves calculations and power, and further reduces processing time (latency).

Figure 4:
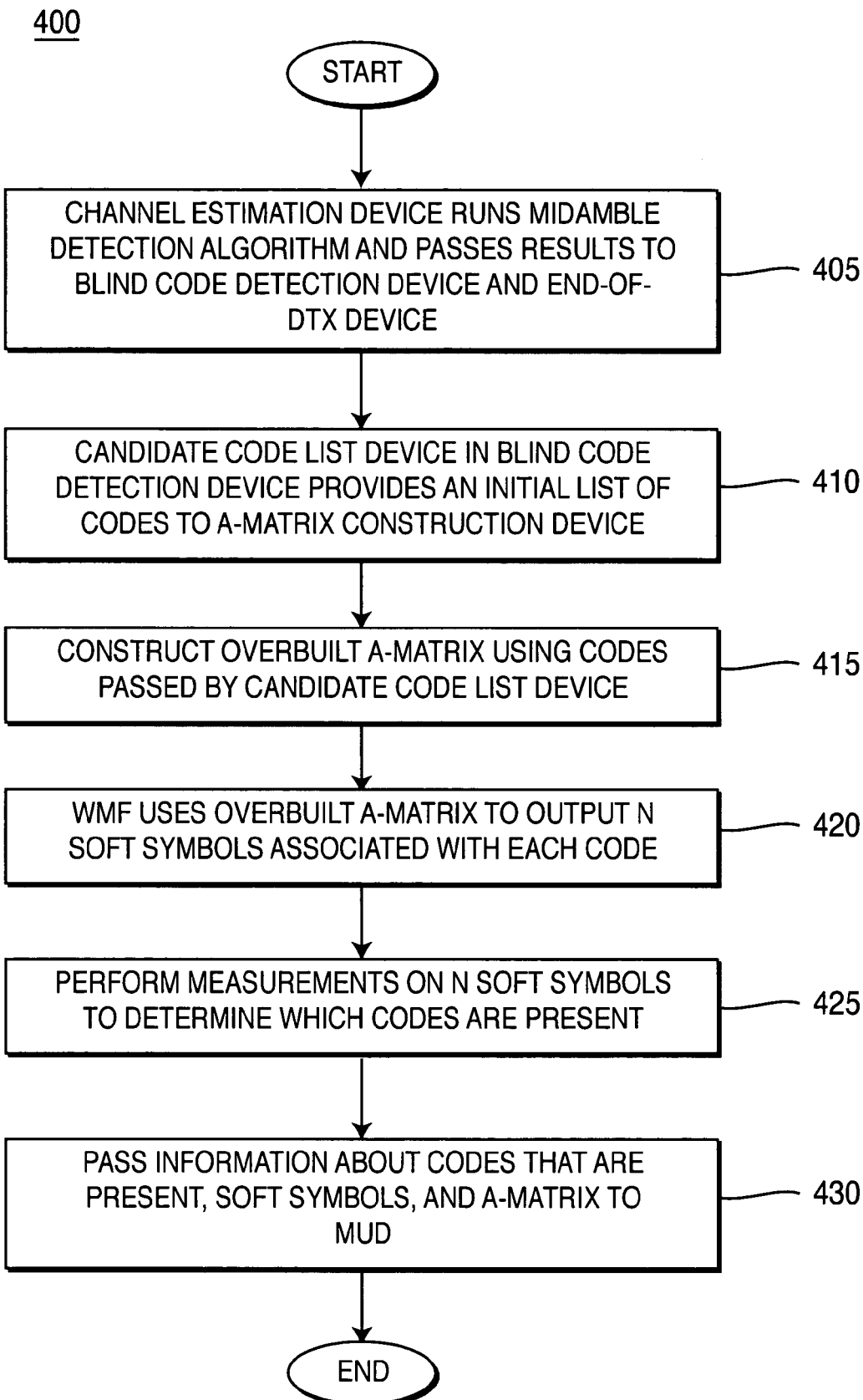
FIG. 4 shows a process for determining valid and invalid codes.

Referring to FIG. 4, the following exemplary steps of a process 400 may be implemented in the performance of the preferred embodiment for the TDD mode of UMTS W-CDMA, although these steps can be applied to other wireless systems.

(1) The channel estimation device 105 runs a midamble detection algorithm which analyzes the midamble field of the received burst to determine the identities of the midamble shifts which are present, estimate the communication channel characteristic, and estimate the midamble powers. The results are passed to the BCD device 120 and the End-of-DTX device 130 (step 405).

(2) The CCL device 135 in BCD device 120 analyzes the results of the midamble detection algorithm implemented by the channel estimation device 105 and removes certain codes from a master list. The CCL device 135 then passes the reduced list of M codes to the A-matrix construction device 110 (step 410).

(3) The overbuilt A-matrix is constructed by the A-matrix construction device 110 once per timeslot using the reduced list of M codes (step 415).

(4) The WMF 150 uses the overbuilt A-matrix to provide soft symbol estimates for the N symbols of the M codes, where $N \leq N_{total}$. N, the number of symbols used in code energy measurement 145, is the larger of that required by the code detect device 140 and the End-of-DTX device 130. Soft symbols are outputted from the WMF 150 associated with each code (step 420).

(5) Measurements are performed on the N soft symbols to determine which codes are present (step 425). The measurements and code presence decisions may be based on energy estimates computed from symbols corresponding to each code (code energy measurements) and thresholds based on code power or noise power estimates.

(6) The N soft symbol estimates are passed to the MUD 115. Codes that are not declared present are invalidated, and codes declared present are validated. The information about codes that have be declared present or not, the N soft symbols, and the A-matrix 110 are passed to the MUD 115 (step 430). The MUD 115 uses only those symbols corresponding to the codes that have been declared present, hence eliminating the need to recompute the WMF 150 outputs; N multiplied by the number of codes declared present.

Initially, to find out which codes are valid and invalid, only the $N \leq N_{total}$ symbols for $A^H r$ are processed. Once that is complete, one possible option is to rebuild the A-matrix such that only codes that have been received are incorporated therein, and the $A^H r$ is recalculated for all of the symbols. This process is inefficient and uses considerable resources. In accordance with the preferred embodiment, although other alternatives may be used, a vector indicating which rows or columns are present in the A-matrix is established. Because the $A^H r$ outputs for the symbols corresponding to the valid codes have already been computed, they are used, i.e., not recomputed, and only $N_{total} - N$ additional symbols are computed corresponding to those codes that were declared valid.

The foregoing is an example of how the MUD 115 processing can be optimized using the invention, to obviate needless use of power, reduce hardware requirements, reduce processing latency, and to avoid needless circuitry or software, as applicable. It is to be noted that the inventive method is capable of accepting modifications without departing from the scope of the invention.

While this invention has been particularly shown and described with reference to a preferred embodiment, it will be understood by those skilled in the art that various changes in form and details may be made therein without departing from the scope of the invention as described hereinabove.

What is claimed is:

1. In a code division multiple access (CDMA) system that receives a plurality of data signals distinguished by codes, a method comprising:
   (a) constructing a system response matrix using all possible codes and channel responses associated with their codes;
   (b) based on the constructed matrix, performing a plurality of soft symbol estimates for symbols of each of the possible codes;
   (c) determining received codes based on the soft symbol estimates;
   (d) extracting data from the matrix associated with the received codes;
   (e) marking codes in the constructed matrix that have not been received by the system as being invalid; and
   (f) marking codes in the constructed matrix that have been received by the system as being valid, wherein the invalid codes are not used to extract data from the matrix.

2. The method of claim 1 wherein step (d) is performed using a multi-user detector (MUD).

3. The method of claim 2 further comprising:
   (g) passing the soft symbol estimates to the MUD, wherein the MUD does not repeat the computation of soft symbols of each received code.

4. The method of claim 1 wherein the soft symbol estimates are used to perform a discontinuous transmission (DTX) detection code energy measurement.

5. The method of claim 1 wherein the soft symbol estimates are based on whitening matched filter (WMF) outputs.

6. In a wireless transmit/receive unit (WTRU) that receives a plurality of data signals distinguished by codes, a method comprising:
   (a) constructing a system response matrix using all possible codes and channel responses associated with their codes;
   (b) based on the constructed matrix, performing a plurality of soft symbol estimates for symbols of each of the possible codes;
   (c) determining received codes based on the soft symbol estimates;
   (d) extracting data from the matrix associated with the received codes;
   (e) marking codes in the constructed matrix that have not been received as being invalid; and
   (f) marking codes in the constructed matrix that have been received as being valid, wherein the invalid codes are not used to extract data from the matrix.

7. A wireless transmit/receive unit (WTRU) that receives a plurality of data signals distinguished by codes, the WTRU comprising:
   (a) means for constructing a system response matrix using all possible codes and channel responses associated with their codes;
   (b) means for performing a plurality of soft symbol estimates for symbols of each of the possible codes based on the constructed matrix;
   (c) means for determining received codes based on the soft symbol estimates; and
   (d) means for extracting data from the matrix associated with the received codes;
   (e) means for marking codes in the constructed matrix that have not been received by the WTRU as being invalid; and
   (f) means for marking codes in the constructed matrix that have been received by the WTRU as being valid, wherein the invalid codes are not used to extract data from the matrix.

8. A wireless transmit/receive unit (WTRU) that receives a plurality of data signals distinguished by codes, the WTRU comprising:
   (a) a device for constructing a system response matrix using all possible codes and channel responses associated with their codes; and
   (b) a whitening match filter (WMF) for performing soft symbol estimates for symbols of each of the possible codes based on the constructed matrix, wherein codes in the constructed matrix that have not been received are marked as being invalid, and codes in the constructed matrix that have been received are marked as being valid.

9. The method of claim 6 wherein step (d) is performed using a multi-user detector (MUD).

10. The method of claim 9 further comprising:
(g) passing the soft symbol estimates to the MUD, wherein the MUD does not repeat the computation of soft symbols of each received code.

11. An integrated circuit (IC) that receives a plurality of data signals distinguished by codes, the IC comprising:
(a) means for constructing a system response matrix using all possible codes and channel responses associated with their codes;
(b) means for performing a plurality of soft symbol estimates for symbols of each of the possible codes based on the constructed matrix;
(c) means for determining received codes based on the soft symbol estimates;
(d) means for extracting data from the matrix associated with the received codes;
(e) means for marking codes in the constructed matrix that have not been received as being invalid; and
(f) means for marking codes in the constructed matrix that have been received as being valid, wherein the invalid codes are not used to extract data from the matrix.

12. An integrated circuit (IC) that receives a plurality of data signals distinguished by codes, the IC comprising:
(a) a device for constructing a system response matrix using all possible codes and channel responses associated with their codes; and
(b) a whitening match filter (WMF) for performing soft symbol estimates for symbols of each of the possible codes based on the constructed matrix, wherein codes in the constructed matrix that have not been received are marked as being invalid, and codes in the constructed matrix that have been received are marked as being valid.

13. The method of claim 6 wherein the soft symbol estimates are used to perform a discontinuous transmission (DTX) detection code energy measurement.

14. The method of claim 6 wherein the soft symbol estimates are based on whitening matched filter (WMF) outputs.

15. The WTRU of claim 7 wherein the means for extracting data is a multi-user detector (MUD).

16. The WTRU of claim 15 further comprising:
(g) means for passing the soft symbol estimates to the MUD, wherein the MUD does not repeat the computation of soft symbols of each received code.

17. The WTRU of claim 7 wherein the soft symbol estimates are used to perform a discontinuous transmission (DTX) detection code energy measurement.

18. The WTRU of claim 7 wherein the soft symbol estimates are based on whitening matched filter (WMF) outputs.

19. A wireless transmit/receive unit (WTRU) that receives a plurality of data signals distinguished by codes, the WTRU comprising:
(a) a device for constructing a system response matrix using all possible codes and channel responses associated with their codes;
(b) a whitening match filter (WMF) for performing a plurality of soft symbol estimates for symbols of each of the possible codes based on the constructed matrix; and
(c) a multi-user detector (MUD) for extracting data from the matrix associated with the received codes, wherein the WMF passes the soft symbol estimates to the MUD, the MUD does not repeat the computation of soft symbols of each received code, codes in the constructed matrix that have not been received by the WTRU are marked as being invalid, and codes in the constructed matrix that have been received by the WTRU are marked as being valid.

20. The IC of claim 11 wherein the means for extracting data is a multi-user detector (MUD).

21. The IC of claim 20 further comprising:
(g) means for passing the soft symbol estimates to the MUD, wherein the MUD does not repeat the computation of soft symbols of each received code.

22. The IC of claim 11 wherein the soft symbol estimates are used to perform a discontinuous transmission (DTX) detection code energy measurement.

23. The IC of claim 11 wherein the soft symbol estimates are based on whitening matched filter (WMF) outputs.

24. The method of claim 19 wherein the soft symbol estimates are used to perform a blind code detection (BCD) code energy measurement.

25. The method of claim 1 wherein the soft symbol estimates are used to perform a blind code detection (BCD) code energy measurement.

26. The method of claim 6 wherein the soft symbol estimates are used to perform a blind code detection (BCD) code energy measurement.

27. The method of claim 7 wherein the soft symbol estimates are used to perform a blind code detection (BCD) code energy measurement.

28. The method of claim 11 wherein the soft symbol estimates are used to perform a blind code detection (BCD) code energy measurement.

* * * * *

UNITED STATES PATENT AND TRADEMARK OFFICE
CERTIFICATE OF CORRECTION

| | |
|---|---|
| PATENT NO. | : 7,031,284 B2 |
| APPLICATION NO. | : 10/725808 |
| DATED | : April 18, 2006 |
| INVENTOR(S) | : Supplee et al. |

It is certified that error appears in the above-identified patent and that said Letters Patent is hereby corrected as shown below:

At column 2, line 1, after the word "that", delete "is" and insert therefor --are--.

Column 6, line 42, after the word "estimates;", delete "and".

Signed and Sealed this

Nineteenth Day of September, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,031,284 B2 | Page 1 of 1 |
| APPLICATION NO. | : 10/725808 | |
| DATED | : April 18, 2006 | |
| INVENTOR(S) | : Supplee et al. | |

It is certified that error appears in the above-identified patent and that said Letters Patent is hereby corrected as shown below:

IN THE CLAIMS

At claim 24, column 8, line 34, delete the word "method" and insert therefore --WTRU--.

At claim 27, column 8, line 44, delete the word "method" and insert therefore --WTRU--.

At claim 28, column 8, line 47, delete the word "method" and insert therefore --IC--.

Signed and Sealed this

Twenty-seventh Day of May, 2008

JON W. DUDAS
*Director of the United States Patent and Trademark Office*